Dec. 25, 1951  J. A. BUCKBEE ET AL  2,579,471
CONTROL SYSTEM FOR DIRECTIVE DEVICE
Filed Dec. 5, 1947
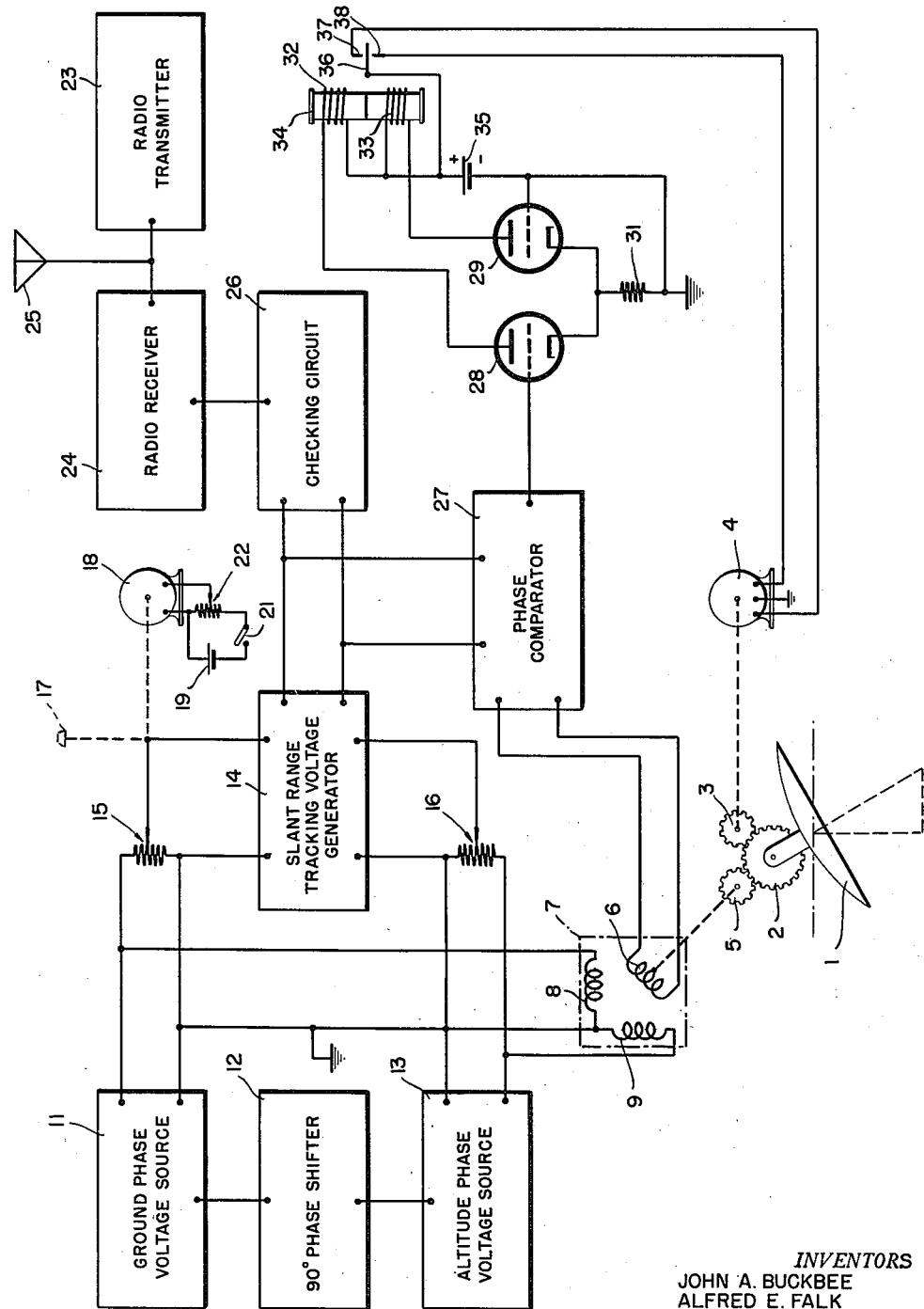
INVENTORS
JOHN A. BUCKBEE
ALFRED E. FALK
BY
Arthur A. Smith
ATTORNEY

UNITED STATES PATENT OFFICE 2,579,471

CONTROL SYSTEM FOR DIRECTIVE DEVICE

John Alan Buckbee, Wellesley, Mass., and Alfred Emil Falk, Fort Wayne, Ind., assignors, by mesne assignments, to Farnsworth Research Corporation, a corporation of Indiana Application December 5, 1947, Serial No. 789,996

6 Claims. (Cl. 343—7)

This invention relates to locating apparatus for determining the range and direction of a target and has particular reference to an automatic control system for maintaining a directive device pointed at a target at all times.

There are many instances where it is necessary or at least desirable to keep a directive device pointed at a target even though there may be relative motion between the target and the directive device. For example, in marine navigation, it is necessary to locate and identify targets such as buoys employed to mark shoals, submerged rocks, boundaries of channels and so forth. When location and identification of such targets is required at night, it is necessary to direct a device such as a searchlight toward the target. Also there is need for similar apparatus in conjunction with air navigation. In the conduct of bombing operations in war time, apparatus of the character described also is useful and is highly desirable particularly when the operations are being conducted during periods of low visibility such as at night time.

For peace time navigational purposes, it is a rather difficult operation to scan the space in the vicinity of a vessel by means of a searchlight in order to locate an object such as a buoy. Inasmuch as some of these objects are painted in relatively dark colors, a sweeping searchlight beam might very easily sweep past a buoy without its being observed. Buoys, however, are not the only targets which need to be located and identified. In some of the sea lanes, there is the need for locating other objects which may be floating at random such as icebergs, derelict ships and the like.

In conducting an airborne bombing operation during war time conditions under cover of darkness, it is necessary to be able to locate the target which it is desired to bomb. In certain types of such operations, it also is necessary to establish the identity of the target which may be located before the actual release of the bombs from the aircraft. For example, by means of radar apparatus, a submarine may be detected and accurately located. However, the radar apparatus is not capable in itself of identifying the submarine. Consequently, to determine whether or not to release the bombs, it is necessary to establish the fact of whether or not the submarine is that of a friend or enemy. Ordinarily, this may be done most effectively by visual means. However, it is not feasible to illuminate the target from the aircraft during the bombing run for the reason that if the submarine is that of an enemy, steps will be taken immediately to evade the attack. Therefore, the target should be illuminated for a relatively short time beginning just before the time at which the bomb is to be released. The observer then can establish the identity of the target and, if it is friendly, the bombing mechanism may be disarmed while, if it is that of an enemy, the bombing run may be completed and the bomb released at the proper time.

In order to be able to momentarily illuminate the target for a brief instant in the manner described, it is necessary that the searchlight be pointed directly at the target at the moment it is energized to properly illuminate the target. In order to best accomplish this, the searchlight should be controlled in such a manner that it is kept constantly directed toward the target for the entire time of the bombing run.

It therefore is an object of the present invention to provide a control system for maintaining a directive device pointed at a target between which and the directive device there may be relative motion.

Another object of the invention is to provide a control system for maintaining an airborne directive device pointed at a ground target at all times while the aircraft bearing the directive device is moving relative to the target.

In accordance with the present invention there is provided a control system for a directive device which functions to constantly compare the actual angular direction of the directive device with respect to some reference direction with the desired angular direction of the directive device with respect to the reference direction. Any deviation of the actual direction of the device from the desired direction is detected and employed to effect a correction in the direction of the directive device. The desired direction of the directive device toward the target may be determined by means of a conventional radio ranging system. From such apparatus there is derived information regarding the slant range or the straight line distance between the directive device and the target. This information is employed to develop a slant range tracking voltage which has a phase relationship to a reference voltage which is proportional to the desired angular direction of the directive device with respect to the reference direction. There also is provided means for deriving two quadrature alternating voltages for impression respectively upon two stator windings of a transducer. The transducer additionally is provided with a rotor winding which is inductively coupled to the two stator windings. The phase of the voltage induced in the rotor winding with respect to either one of the quadrature voltages applied to the stator windings is dependent upon the angular relationship between the rotor and the stator windings. The rotor winding is mechanically coupled to the directive device so that it will assume an angular position corresponding to the angular position of the directive device. The voltage derived from the rotor winding is compared in phase with the developed slant range tracking voltage and any deviation in phase between these two voltages is employed to correct the angular position of the directive device so that it corresponds with the desired angular direction of the directive device with respect to the reference direction.

For a better understanding of the invention, together with other and further objects thereof, reference is made to the following description, taken in connection with the accompanying drawing, and its scope will be pointed out in the appended claims.

The single figure of the drawing is a diagrammatic representation of a control system for a directive device embodying the present invention.

Referring now to the drawing, there is shown a directive device 1 which may consist of a concave reflector within which is mounted a source of radiant energy such as an electric light, a radio antenna or the like. For the purpose of the present illustrative embodiment of the invention it will be assumed that the directive device is a searchlight which is capable of projecting a relatively narrow intense beam of light. Also assume that the searchlight is mounted in an airplane and is provided with suitable mechanism for changing its angular direction to coincide with the actual elevation of the airplane with respect to a ground target. Such a mechanism is illustrated herein diagrammatically as a gear 2 rigidly attached to the housing of the searchlight and a driving gear 3 which is meshed with the gear 2 and is mechanically coupled to the rotor of a reversible driving motor 4. By suitably energizing the motor, it may be driven in either direction whereby the searchlight 1 may be tilted either upward or downward.

Also meshed with the searchlight gear 2 is a follower gear 5 which is mechanically coupled to a rotor winding 6 of an inductive transducer 7. The transducer also is provided with two stator windings 8 and 9. The transducer is essentially a rotating transformer. The stator windings are so formed and mounted in the device that the phase of the voltage induced in the rotor winding with respect to one of the stator winding voltages is representative of the angular relationship of the rotor winding to the stator windings.

The control apparatus also includes a source of a reference voltage. For the purpose of this description the reference voltage will be referred to as a ground phase voltage. The ground phase reference voltage is an alternating voltage derived from a source 11 and electrically corresponds in phase to the horizontal component of the line between the airplane and the target. This alternating voltage is impressed upon a 90 degree phase shifting circuit 12 whereby there may be derived another alternating voltage having a quadrature phase relationship to the ground phase voltage. This quadrature voltage is referred to herein as an altitude phase voltage and is developed in a source 13. The altitude phase voltage electrically corresponds in phase to the vertical component of the line between the airplane and the target. The ground phase voltage source 11 is coupled to the stator winding 8 and the altitude phase voltage source 13 is coupled to the stator winding 9.

The apparatus also includes a slant range tracking voltage generator 14, the function of which is to produce an alternating voltage which is related in phase to a reference voltage such as the ground phase voltage in correspondence with the desired angular elevation of the directive device relative to a reference direction which, in the present case, will be assumed to be the horizontal direction in which the airplane is moving toward the target. The slant range tracking voltage is produced by combining the ground phase voltage and the altitude phase voltage in suitable proportions to effect the desired phase relationship. To accomplish this a potentiometer 15 is coupled between the ground phase voltage source 11 and the slant range tracking voltage generator 14 and a potentiometer 16 is coupled between the altitude phase voltage source 13 and the slant range tracking voltage generator. Suitable manipulation of these potentiometers in a manner to be described will effect the generation of the desired slant range tracking voltage. The potentiometer 15 may be provided with a manual control knob 17 and also may be mechanically coupled to a motor 18 for continuous adjustment. The motor 18 is energized from a power source 19 to which it is connected through a switch 21 and a speed controlling rheostat 22.

For the purpose of checking the accuracy of the phase of the generated slant range tracking voltage the apparatus also may include a radio transmitter 23 and a radio receiver 24, both of which are coupled to an antenna 25. The radio transmitter and receiver are devices capable of operating at ultra-high frequencies. Such apparatus is used extensively for radio ranging and is commonly known as radar equipment. From the transmitter there is derived a series of relatively short time-spaced radian energy impulses which are propagated by the antenna 25 toward the target. The target reflects some of the energy of these impulses and the reflected energy is intercepted by the antenna 25 and impressed upon the radio receiver 24. The receiver functions to produce signal effects which are representative of the range or distance of the target from the airplane.

The generated slant range tracking voltage derived from the generator 14 is impressed upon a checking circuit 26. This apparatus also is coupled to the radio receiver 24 whereby the information respecting the range of the target derived from the receiver may be employed to check the accuracy of the generated slant range tracking voltage.

The slant range tracking voltage generator 14 also is coupled to a phase comparator 27. The rotor winding 6 of the transducer 7 also is coupled to the phase comparator. This apparatus functions independently of the respective amplitudes of the voltages impressed thereon to compare the phase of these voltages.

The output circuit of the phase comparator is coupled to a differential amplifier comprising a pair of vacuum tubes 28 and 29. The output circuit of the phase comparator is coupled to the grid of the tube 28 and the grid of the tube 29 is connected directly to ground. The cathodes of the two tubes are connected together and coupled to ground through a biasing resistor 31.

The anodes of the amplifier tubes 28 and 29 are connected respectively to the windings 32 and 33 of a relay 34. The other terminals of these relay windings are connected to the positive terminal of a source of unidirectional energy such as a battery 35, the negative terminal of which is grounded. The armature 36 of the relay is connected to the positive terminal of the battery 35 and the upper and lower contacts 37 and 38 respectively are connected to two terminals of the driving motor 4. A third terminal of the motor is connected to ground.

For the purposes of the following description of the operation of the control system embodying the instant invention, it will be assumed that the airplane is flying at a known constant speed in a straight line course toward the target and at a fixed known altitude relative to the target. By means of the radio ranging apparatus including the transmitter 23 and the receiver 24 the slant distance between the airplane and the target may be accurately determined. From the distance between airplane and target determined in the manner described and the known altitude of the airplane the angular elevation of the airplane relative to the target may be determined. The potentiometer 16 is adjusted to impress upon the slant range tracking voltage generator 14 an alternating voltage having a 90 degree phase relationship to the ground phase reference voltage and a magnitude proportional to the known altitude of the airplane. The potentiometer 15 also is adjusted by means of the knob 17, for example, to impress upon the slant range tracking voltage generator a ground phase alternating voltage of such a magnitude that, when it is combined vectorially with the altitude phase voltage, there will be produced a slant range alternating tracking voltage which has the same phase relationship with respect to the ground phase voltage as the desired angular elevation of the aircraft relative to the target. Such adjustments are made at the beginning of a run over a target. The motor 18 then is placed in operation by closing the switch 21 and the rheostat 22 adjusted so as to vary the potentiometer 15 at a rate such that the ground phase voltage impressed upon the generator 14 decreases at the same rate as the horizontal distance between the aircraft and the target is decreased. Such a speed adjustment of the motor 18 may be made with a fair degree of accuracy by suitable calibration, knowing the ground speed of the airplane.

As the airplane approaches the target, the radio ranging apparatus continues to impress signal effects upon the checking circuit 26 which are representative of the actual slant distance between the airplane and the target. As long as the motor 18 is changing the setting of the potentiometer 15 at the proper rate, the slant range tracking voltage developed by the generator 14 corresponds in phase to the ground phase reference voltage identically with the actual angular elevation of the airplane with respect to the target.

However, after continuing the run toward the target for some distance, it may appear from the checking circuit 26 that the ground range voltage is not being changed in magnitude in correspondence with the actual change in horizontal distance between the airplane and the target. Assume that the motor 18 originally was adjusted to operate the potentiometer 15 to correspond with a ground speed of the airplane of 200 miles per hour. Also assume that, after making the second check, it is determined from a suitably calibrated instrument that the ground phase voltage rate of change is lagging behind the actual ground speed of the airplane by 20 miles per hour. The control knob 17 may be manually turned to adjust the potentiometer 15 to the proper value to produce a ground phase voltage which is capable of being combined with the altitude phase voltage to produce the correct slant range tracking voltage in the generator 14. At the same time the speed control rheostat 22 is adjusted to operate the motor 18 at a slightly faster rate, whereby it will effect the desired rate of change in the setting of the potentiometer 15 to thereafter impress the proper ground phase voltage upon the generator 14.

Assume that at a given instant the axis of the directive device 1 is pointed directly at the target. In such a case the phase of the voltage induced in the rotor winding 6 of the transducer 7 will be identical to the phase of the slant range tracking voltage derived from the generator 14. When these two voltages are impressed upon the phase comparator 27, this apparatus will detect no phase deviation. Accordingly, there is impressed upon the differential amplifier tube 28 a normal control voltage. This voltage is of such a polarity and magnitude to effect a normal predetermined conduction of space current in the tube 28. This current, flowing through the cathode connecting resistor 31, is effective to impress a voltage upon the cathode of the tube 29 suitable to effect a conduction of space current in this tube of substantially the same magnitude as in the tube 28. It should be noted that, by reason of the coupling of the tubes 28 and 29, the space current flowing in these tubes are of opposite phase.

Both of the windings 32 and 33 of the relay 34 consequently will be traversed by currents of equal magnitude. By reason of the manner in which these windings are placed upon the core of the relay, the energization thereof produces a net magnetomotive force which is substantially equal to zero. This balanced effect results in the positioning of the armature 36 at a central point midway between the contacts 37 and 38. The circuit of the motor 4 which is controlled by these contacts hence is not energized.

Now assume that, as a result of the continued forward motion of the aircraft, the searchlight 1 is slightly lagging in elevation relative to the correct elevation of the target with respect to the aircraft. In this case the rotor 6 of the transducer 7 will be in a corresponding position so that the voltage which is induced therein will have a phase relationship with respect to the ground phase voltage which is representative of the lagging orientation of the searchlight. This phase relationship will differ from the phase relationship of the slant range tracking voltage relative to the ground phase voltage. Consequently, when the slant range tracking voltage derived from the generator 14 and the voltage derived from the rotor 6 are impressed on the phase comparator 27 it functions to detect the different phase relationship. Also, suppose that, under the assumed conditions, the phase comparator develops a voltage representative of the phase deviation which is more than normally positive relative to ground. The impression of this more positive voltage upon the control grid of the amplifier tube 28 increases the magnitude of a space current and conduction in the tube and through the common cathode resistor 31 and the upper relay winding 32. The increased current flow in the resistor 31 serves to bias off the amplifier tube 29, thereby decreasing the magnitude of the space current conduction in this tube and in the lower relay winding 33. The increase of current in the upper relay winding 32 and the concurrent decrease of current flow through the lower relay winding 33 effects the engagement of armature 36 with its upper contact 37. The motor 4 accordingly is energized to effect a rotation of its armature in a direction to increase the angle of tilt of the searchlight 1 relative to the horizontal plane.

When the searchlight is tilted sufficiently in the manner described and the rotor winding 6 of the transducer 7 likewise is correspondingly rotated sufficiently to effect coincidence between the angle of tilt of the searchlight and the desired angular elevation of the target relative to the aircraft, the phase of the voltage derived from the rotor 6 and the phase of the slant range tracking voltage relative to the ground phase voltage is identical. The phase comparator 27 then functions to restore the normal voltage upon the control grid of the amplifier tube 28. Space current conduction in the tubes 28 and 29 thus is restored to normal whereby to equalize the magnitude of the current flowing in the relay windings and thereby to disengage the armature 36 from its upper contact 37. The motor 4 is then de-energized and further tilting of the searchlight 1 is stopped.

If, for any reason the searchlight becomes tilted to too great an angle relative to the horizontal plane so that it leads the true angular elevation of the target relative to the aircraft, the voltage induced in the rotor winding 6 of the transducer 7 will have a phase relationship with respect to the ground phase voltage which is representative of the leading tilt of the searchlight. When this voltage is compared with the slant range tracking voltage by the phase comparator, there is produced in its output circuit a voltage which is less positive than normal. Current conduction in the amplifier tube 28 thereby is decreased and, by reason of the functioning of the biasing resistor 31, current conduction in the tube 29 is increased. Consequently, there is an increased current flow in the lower relay winding 33 and a concurrent decreased current flow in the upper relay winding 32. Such energization of the relay 34 effects the engagement of the armature 36 with the lower contact 38 whereby the motor 4 is energized to effect rotation of its rotor in a direction to reduce the angle of tilt of the searchlight relative to the horizontal plane. Again, as soon as the tilt angle of the searchlight corresponds with the true angular elevation of the target relative to the aircraft, the phase of the voltage derived from the transducer rotor 6 and the phase of the slant range tracking voltage relative to the ground phase voltage coincides and the phase comparator 27 functions to restore the amplifier and differential relay to normal.

It is seen that, by the use of apparatus embodying the present invention, a directive device may be moved in such a manner that it may be kept pointed at a target substantially at all times. In the case where the directive device is a searchlight it may be energized at any desired time to illuminate the target. In such a case there is assurance that, whenever it is energized, it will be pointed directly at the target so that it is unnecessary to search a considerable portion of a space surrounding the target in order to locate it. When used for such a purpose, it is readily apparent that a bombing run may be made on a target such as a submarine, for example, without disclosing the location of the aircraft until the bomb load is about to be released. Thus, any evasive tactics on the part of the submarine will be obviated.

As indicated previously, the apparatus also has utility for certain operations aside from those arising out of a condition of warfare. Airplanes, boats or the like may employ apparatus embodying the present invention for the location and identification of certain targets such as buoys and the like. The radio ranging and locating apparatus forming a part of the instant equipment, will enable ready location of the target, but unless the target is equipped with radio identifying facilities, it is necessary to identify the object by visual means. Hence, by employing the radio locating apparatus in cooperation with an embodiment of the present invention, a searchlight may be trained directly on the located target thereby enabling its identification by visual means.

It obviously is not essential that the directive device be a searchlight as illustratively disclosed herein. It is considered to be within the scope of this invention that the directive device may include a radio beaming antenna. In this case a highly directive beam of radiant energy such as an ultra high frequency radio wave be maintained directed at a target by means of apparatus such as that disclosed. For example, the antenna 25 used in the radio ranging and locating apparatus may very well be mounted within a directive device such as the reflector 1. In this case the antenna may be directed at the target substantially at all times, thereby eliminating the necessity of providing either an antenna having a relatively wide angle beam or an antenna which is constantly swept through a given portion of the space surrounding the target.

While the present invention has been described herein as being applicable to the orientation of a directive device relative to a target in angular elevation, it should be apparent that the system is not necessarily limited to this one control of the directive device. It is considered that the invention is susceptible of modification by those skilled in the art so that the directive device may be properly oriented in azimuth as well as elevation. Essentially the principal difference in controlling the directive device in this manner is the choice of the reference line. For the purpose of controlling the device in azimuth, the reference line may well be the slant range between the device and the target. Any deviation of the axis of the directive device from the slant range direction may be detected and the device reoriented correctly substantially in the manner described for elevational control of the directive device. Also it is contemplated that the invention is of such scope that the directive device may be controlled concurrently by apparatus such as that disclosed both in elevation and in azimuth.

Also it is to be understood that the invention is not necessarily limited for use in conjunction with radio ranging apparatus. The ranging apparatus disclosed herein is one convenient means of determining the desired direction in which the directive device is to be pointed. It will be apparent to those versed in the art that other means may be employed satisfactorily for this purpose. For example, under suitable conditions the desired direction may be obtained optically by such means as a telescope which an operator may keep pointed at the target. The angular relationship between the axis of the telescope and a reference line such as one lying the horizontal plane in which the airplane is moving may be indicated on a dial and a suitable slant range tracking voltage may be manually developed in accordance with the dial indication. Alternatively, the angular relationship of the optical viewing device such as a telescope to a reference line may be automatically translated into a slant range tracking voltage by any suitable means, many of which are known to those skilled in the art.

Furthermore, apparatus embodying the present invention may be used in such a manner that the directive device is not necessarily pointed directly at the object or target which is tracked by the radio ranging apparatus. For example, consider the case where the target or object of interest is small relative to other objects of no interest located in the vicinity. In these circumstances the radio ranging apparatus will not respond as readily to the presence of the object of interest as it will to some of the more massive objects in the vicinity. Consequently, if the relationship is known between the desired target and another object in the vicinity which is susceptible of being readily tracked by the radio ranging apparatus, then, knowing also the altitude at which the airplane is moving, the necessary angular deviation between the two objects can be computed.

While there has been described what is at present considered the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A control system for maintaining the axis of a directive device in a plane of a target comprising, a radio ranging apparatus for developing reference voltage representative of the desired angular elevation of said directive device relative to the target, means for developing a first alternating control voltage having a phase relationship to said reference voltage according to an estimation of said desired angular elevation, means for checking said phase relationship, means for adjusting said phase relationship, means including a reversible motor for rotating said directive device in either direction in a vertical plane, a transducer having a pair of stator windings and a rotor winding, said rotor winding being positionable in correspondence with the directive device, means for energizing said stator windings by respective alternating voltages having a quadrature phase relationship to one another and one of said energizing voltages being of the same phase as said control voltage, said rotor winding thereby developing a second alternating control voltage having a phase relationship to said first control voltage representative of the actual angular elevation of said directive device relative to said target, means for detecting phase deviations between said rotor developed control voltage and said first control voltage, and means responsive to detected phase deviations to energize said motor suitably to effect rotation of said directive device in a sense to correct its angular elevation relative to said target.

2. A control system for maintaining the axis of a directive device in a plane of a target comprising, a radio ranging apparatus including a radio transmitter and receiver for developing a reference voltage corresponding to the desired angular elevation of said directive device relative to the target, means for developing from said energizing voltages a first alternating control voltage in phase with one of said energizing voltages and having a phase relationship to said reference voltage according to an estimation of said desired angular elevation, means for checking said phase relationship, means for adjusting said phase relationship, a transducer having two stator windings, means for energizing said windings by respective alternating voltages having a quadrature phase relationship to one another, a rotor winding in said transducer inductively coupled to said stator windings and linked to said directive device in a manner to follow rotative movements of said directive device, said rotor winding serving to develop a second alternating control voltage having a phase relationship to said reference voltage representative of the actual angular elevation of said directive device relative to said target, means including a phase comparator for detecting phase deviations between the control voltage produced in said rotor winding and said first control voltage, means for amplifying said detected phase deviations, relay means responsive to said amplified phase deviations, and a reversible motor coupled to said relay means for energization to drive said directive device in a suitable direction to correct the angular elevation of said directive device relative to said target.

3. A control system for maintaining the axis of a directive device in a plane of a target comprising, means for producing two alternating voltages having a quadrature phase relationship to one another, means for combining said two voltages in suitable ratio to develop a third alternating voltage having a phase relationship to one of said quadrature voltages corresponding to the desired angular elevation of said directive device relative to the target, a transducer having two stator windings coupled respectively to said quadrature voltage producing means, a rotor winding in said transducer coupled to said directive device in a manner to follow movements of said directive device and developing a fourth alternating voltage having a phase relationship to one of said quadrature voltages representative of the angular elevation of said directive device relative to said target, means for detecting phase deviations between said third and fourth voltages, and a reversible motor responsive to detected phase deviations to drive said directive device in either of two directions to correct the angular elevation of said directive device relative to the target.

4. A control system for maintaining the axis of a directive device in a plane of a target comprising, a source of a first alternating voltage, a source of a second alternating voltage having a quadrature phase relationship to said first voltage, means for deriving from said first and second voltages a third alternating voltage having a phase relationship to either one of said first and second voltages corresponding to the desired angular elevation of said directive device relative to said target, an electrical transducer having two stator windings coupled respectively to said first and second voltage sources, a rotor winding in said transducer mechanically coupled to said directive device in a manner to follow movements of said directive device, said rotor winding being inductively coupled to said stator windings and developing a fourth alternating voltage having a phase relationship to one of said first two voltages representative of the angular elevation of said directive device relative to said target, means coupled to detect phase deviations between said third and fourth voltages, means including an amplifier responsive to said detected phase deviations, and a reversible motor to drive said directive device in either of two directions, said motor being coupled to said amplifier for rotation in a direction to correct the angular elevation of said directive device relative to the target.

5. A control system for maintaining the axis of a directive device in a plane of a target comprising, a source of ground phase alternating voltage, a source of altitude phase alternating voltage having a quadrature phase relationship to said ground phase voltage, means coupled to said two phase voltage sources developing a slant range tracking alternating voltage proportional to the vector sum of said two phase voltages, an inductive transducer having two stator windings coupled respectively to said two phase voltage sources, a rotor winding in said transducer linked to said directive device in a manner to follow movements of said directive device, said rotor winding being inductively coupled to said stator windings and developing an alternating voltage having a phase relationship to said ground phase voltage representative of the angular elevation of said directive device relative to said target, a phase comparator coupled to said slant range tracking voltage developing means and to said rotor winding and serving to detect phase deviations between the voltage produced in said rotor winding and said slant range tracking voltage, an amplifier coupled to said phase comparator and responsive to said detected phase deviations, a relay having its winding coupled to said amplifier and having contacts positionable according to the sense of a detected phase deviation, and a reversible motor linked to drive said directive device in either of two directions, said motor being electrically coupled to said relay contacts for rotation in a direction to correct the angular elevation of said directive device relative to the target.

6. A control system for maintaining the axis of a directive device in a plane of a target comprising, a source of ground phase alternating voltage, means including a 90 degree phase shifting device coupled to said ground phase voltage source producing an altitude phase alternating voltage having a quadrature phase relationship to said ground phase voltage, means coupled to said ground phase voltage source and to said altitude phase voltage producing means developing a slant range tracking alternating voltage proportional to the vector sum of said two phase voltages, an inductive transducer having two stator windings coupled respectively to said ground phase voltage source and to said altitude phase producing means, a rotor winding in said transducer mechanically linked to said directive device in a manner to follow movements of said directive device, said rotor winding being inductively coupled to said stator windings and developing an alternating voltage having a phase relationship to said ground phase voltage representative of the angular elevation of said directive device relative to said target, a phase comparator coupled to said slant range tracking voltage developing means and to said rotor winding and serving to detect phase deviations between the voltage produced in said rotor winding and said slant range tracking voltage, an amplifier having an input circuit coupled to said phase comparator and responsive to said detected phase deviations, a differential relay having its operating windings coupled to an output circuit of said amplifier and having contacts positionable according to the sense of a detected phase deviation, and a reversible motor mechanically linked to drive said directive device in either of two directions, said motor being electrically coupled to said relay contacts for rotation in a direction to correct the angular elevation of said directive device relative to the target.

JOHN ALAN BUCKBEE.
ALFRED EMIL FALK.

REFERENCES CITED

The following references are of record in the file of this patent:

UNITED STATES PATENTS

| Number | Name | Date |
| --- | --- | --- |
| 2,412,632 | Sanders | Dec. 17, 1946 |
| 2,417,248 | Godet | Mar. 11, 1947 |
| 2,420,334 | White | May 13, 1947 |
| 2,444,171 | Sanders | June 29, 1948 |
| 2,446,024 | Porter | July 27, 1948 |
| 2,448,007 | Ayres | Aug. 31, 1948 |